US007547266B2

(12) United States Patent
Inoue et al.

(10) Patent No.: US 7,547,266 B2
(45) Date of Patent: Jun. 16, 2009

(54) SHIFT DEVICE OF TRANSMISSION

(75) Inventors: Yuji Inoue, Nisshin (JP); Yasushi Kobiki, Toyota (JP); Toshiharu Asai, Toyota (JP); Takehiro Uchida, Toyota (JP); Yasuo Shimizu, Toki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 374 days.

(21) Appl. No.: 11/490,236

(22) Filed: Jul. 21, 2006

(65) Prior Publication Data
US 2006/0258503 A1 Nov. 16, 2006

Related U.S. Application Data

(62) Division of application No. 10/857,973, filed on Jun. 2, 2004, now Pat. No. 7,094,177.

(30) Foreign Application Priority Data
Jun. 18, 2003 (JP) ............................. 2003-172925

(51) Int. Cl.
| B60W 10/04 | (2006.01) |
| B60K 17/04 | (2006.01) |
| G06F 17/00 | (2006.01) |
| B60Q 1/00  | (2006.01) |
| F16H 61/16 | (2006.01) |

(52) U.S. Cl. .................. 477/34; 74/473.12; 701/64; 340/456; 477/125

(58) Field of Classification Search .................. 477/34, 477/125, 183; 74/473.12, 473.1, 335, 900; 701/52, 62, 64, 66; 340/456
See application file for complete search history.

(56) References Cited

U.S. PATENT DOCUMENTS

| 5,178,042 | A    | 1/1993 | Moroto et al. ................. 477/65 |
| 5,415,056 | A    | 5/1995 | Tabata et al. .................. 74/335 |
| 6,012,352 | A    | 1/2000 | Ishii et al. ................. 74/473.18 |
| 6,089,118 | A *  | 7/2000 | Ishii et al. ................. 74/473.18 |
| 6,948,582 | B2   | 9/2005 | Shiomi et al. ................ 180/315 |
| 7,094,177 | B2 * | 8/2006 | Inoue et al. .................... 477/34 |
| 2002/0129672 | A1 | 9/2002 | Vogel et al. |

(Continued)

FOREIGN PATENT DOCUMENTS

DE 100 02 441 A 1 8/2001

(Continued)

OTHER PUBLICATIONS http://www.phillycarshare.org/html/fleet_PriusINstructions.htm, Apr. 26, 2006.

*Primary Examiner*—Roger Pang
(74) *Attorney, Agent, or Firm*—Oblon, Spivak, McClelland, Maier & Neustadt, P.C.

(57) ABSTRACT

A shift control ECU includes the steps of storing a position of a shift lever; starting a count-up timer when the shift lever comes to a neutral position; and recognizing a driver's request for the neutral position when a count-up timer value attains TN(1) if the stored shift lever position is a home position and when a count-up timer value attains TN(2) if the stored shift lever position is not the home position. Here, TN(1) is set to be smaller than TN(2).

10 Claims, 12 Drawing Sheets

U.S. PATENT DOCUMENTS

| | | |
|---|---|---|
| 2002/0162699 A1 | 11/2002 | Shiomi et al. |
| 2004/0266583 A1 | 12/2004 | Henneken et al. ............. 477/34 |
| 2005/0039562 A1 | 2/2005 | Kako et al. ............. 74/473.33 |

FOREIGN PATENT DOCUMENTS

| | | |
|---|---|---|
| DE | 101 12 698 A 1 | 9/2002 |
| JP | 9-166210 | 6/1997 |
| JP | 2002-264684 | 9/2002 |
| JP | 2003028292 A | 1/2003 |
| JP | 2003-34157 | 2/2003 |

* cited by examiner

F I G. 4
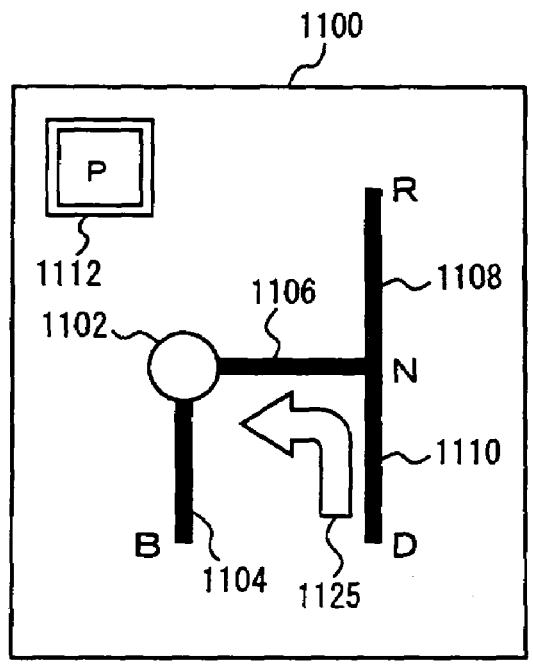
F I G. 5
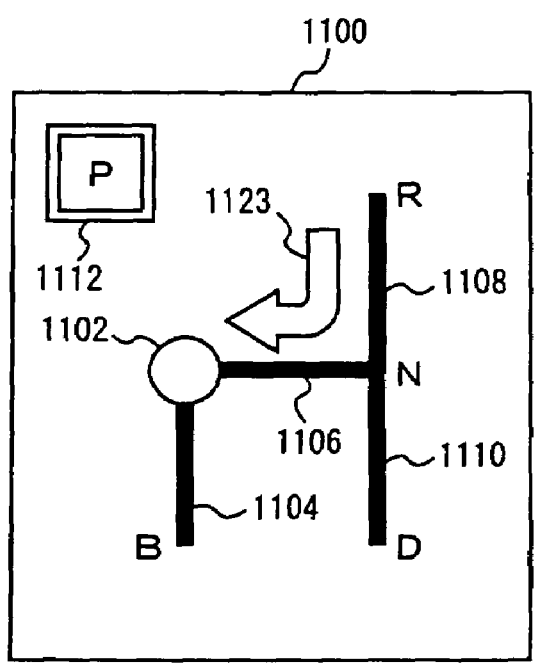

| SHIFT LEVER POSITION BEFORE N POSITION IS PASSED | N POSITION RECOGNITION TIME |
|---|---|
| HOME POSITION | TN (1) |
| D POSITION R POSITION | TN (2) |

TN (1) < TN (2)

TIME REQUIRED
FOR PASSING
N POSITION WHEN
SHIFT LEVER
MOVES FROM
D POSITION OR
R POSITION TO
HOME POSITION

ATMOSPHERIC TEMPERATURE
OF SHIFT SWITCH

| ATMOSPHERIC TEMPERATURE OF SHIFT SWITCH | LOW ⇔ HIGH |
|---|---|
| N POSITION RECOGNITION TIME TN(2) | LONG ⇔ SHORT |

FIG. 13

| POSITION BEFORE N POSITION IS PASSED | N POSITION RECOGNITION TIME |
|---|---|
| B POSITION | TN(3) |
| POSITIONS OTHER THAN B POSITION | TN(4) |

TN(3)>TN(4)

F I G. 1 5

| STATE OF VEHICLE | N POSITION RECOGNITION TIME |
|---|---|
| DRIVE STATE | TN(5) |
| AT REST | TN(6) |

TN(5)>TN(6)

SHIFT DEVICE OF TRANSMISSION

This application is a divisional of and claims the benefit of priority from U.S. Ser. No. 10/857,973, filed Jun. 2, 2004 and is based on Japanese Patent Application No. 2003-172925 filed with the Japan Patent Office on Jun. 18, 2003, the entire contents of which are hereby incorporated by reference.

FIELD OF THE INVENTION

The present invention relates to a shift device for a vehicle, and more particularly to a shift device for shifting a shift position of a transmission in response to a signal obtained by detecting a state of shift manipulation by a driver.

DESCRIPTION OF THE BACKGROUND ART

Examples of an automatic transmission mounted on a vehicle include a gear-type automatic transmission constituted of a hydraulic coupling such as a torque converter and a gear transmission mechanism and a continuously variable automatic transmission constituted of two pulleys having an effective diameter variable depending on a hydraulic pressure and a metal belt wound on the pulleys.

The gear-type automatic transmission is connected to an engine via a hydraulic coupling such as a torque converter. The gear-type automatic transmission is constituted of a transmission mechanism (gear transmission mechanism) including a plurality of powertrains. For example, the gear-type automatic transmission is structured such that the powertrain is automatically shifted based on a degree of accelerator pressing down and a vehicle speed, that is, a speed change ratio is automatically shifted (gear combination is changed). In the gear-type automatic transmission, a gear is determined by engagement and disengagement of a friction element such as a clutch element, a brake element and a one-way clutch element into/from a prescribed state.

The continuously variable automatic transmission is also connected to an engine via a hydraulic coupling such as a torque converter. A belt-type continuously variable transmission, for example, achieves continuously variable shift by using a metal belt and a pair of pulleys and varying the effective diameter of the pulleys depending on the hydraulic pressure. More specifically, an endless metal belt is wound on a pulley on the input side attached to an input shaft and a pulley on the output side attached to an output shaft for use. Each of the pulley on the input side and the pulley on the output side is provided with a pair of sheaves of which recess width is variable in a continuous manner. By varying the recess width, a winding radius of each of the pulley on the input side and the pulley on the output side of the endless metal belt is varied, so that a ratio of rpm of the input shaft to the output shaft, that is, a speed change ratio, can be varied in a continuously variable manner.

In an automatic transmission of any type as described above, in general, a slide-type shift lever manipulated by a driver is provided in a vehicle equipped with an automatic transmission. Shift positions (such as a rearward drive position, a neutral position, and a forward drive position) are set based on a sliding manipulation of the shift lever.

Recently, in addition to a shift device implemented by such a slide-type shift lever, a shift-by-wire type shift device is also known. In the shift device of this type, shift manipulation by the driver is detected by a sensor or a switch (sensor kinds), and one position out of a plurality of positions is selected in accordance with a detection signal. In addition, in the shift-by-wire type shift device, the shift lever is not limited to a slide-type, and adoption of a joy-stick type manipulation member or a push-button type manipulation member is also proposed. As to the joy-stick type manipulation member, the driver tilts the lever in a forward/rearward and right/left direction so as to perform shift manipulation. When the lever is not manipulated, it automatically returns to a home position in the center by a biasing force of a spring, for example. Therefore, if the driver takes his hand off the lever after manipulation, the lever returns to the home position in the center, and it is no longer possible to check a current manipulation state from appearance.

When a push-button type manipulation member is adopted, the manipulation member (push button) state may automatically return to a pre-manipulation state after the driver finishes manipulation, and again it is impossible to check a current manipulation state from the appearance. Not only in these examples but also in a manipulation member of other types such as a touch-screen type manipulation member that automatically returns to its pre-manipulation state after manipulation by the driver (hereinafter, referred to as "momentary-type manipulation member"), it is sometimes impossible to check a manipulation state from appearance of a shift manipulation portion. Therefore, if such a momentary-type manipulation member is adopted in the shift manipulation portion, combined with discrepancy between a position shift procedure and a manipulation procedure, the driver may have uncomfortable feeling.

Japanese Patent Laying-Open No. 2002-264684 discloses a shift device of a vehicle capable of avoiding uncomfortable feeling of a driver due to adoption of a shift-by-wire type shift device. The shift device includes a gear range shifting mechanism, which is actuated to mechanically shift the actual gear ranges of a transmission; an actuator for actuating the gear range shifting mechanism; a manipulation range detecting circuit for detecting a manipulation range representing manipulation of a shift manipulation portion by a driver; an actual gear range detecting circuit detecting the actual gear range of the gear range shifting mechanism; and a controller for shifting the actual gear ranges of the transmission by controlling the actuator in accordance with detection signals from the manipulation range detecting circuit and the actual gear range detecting circuit. The shift device of a vehicle further includes a manipulation range indicating portion for indicating the manipulation range by the driver based on the detection signal from the manipulation range detecting circuit. The manipulation range indicating portion allows to indicate that the manipulation range does not correspond to the detection signal from the manipulation range detecting circuit.

According to the shift device disclosed in Japanese Patent Laying-Open No. 2002-264684, when the driver manipulates the shift manipulation portion, the actuator is driven in accordance with the manipulation range obtained based on the detection signals from the manipulation range detecting circuit and the actual gear range detecting circuit and the actual gear range of the gear range shifting mechanism, and gear range of the transmission is shifted by actuation of the gear range shifting mechanism. In addition, the manipulation range of the shift manipulation portion obtained based on the detection signal from the manipulation range detecting circuit is indicated by the manipulation range indicating portion. By providing the manipulation range indicating portion, it is ensured that the driver can recognize the manipulation range that he made. In particular, when the "momentary-type" manipulation member with which it is difficult to determine the manipulation range from the appearance is adopted in the shift manipulation portion, it will be difficult to have the driver accurately recognize the manipulation range without such a manipulation range indicating portion. In such a structure, a position setting of the transmission (actual position) is not necessarily shifted in synchronization with manipulation of the shift manipulation portion by the driver (manipulation position). According to this shift device, the manipulation range indicating portion allows to indicate that the manipulation range does not correspond to the detection signal from the manipulation range detecting circuit, and indication of the manipulation range can be set as required in a flexible manner without being bound by shift manipulation by the driver. Therefore, the shift device can be configured so as to avoid or mitigate uncomfortable feeling of the driver by modifying indication on the manipulation range indicating portion in a flexible manner if there may be a possibility to cause such feeling to the driver by maintaining indication as it is while usually having him/her accurately recognize the manipulation range.

On the other hand, the shift device disclosed in Japanese Patent Laying-Open No. 2002-264684 has the following disadvantage. The detecting circuit detects shift manipulation by the driver through the momentary-type manipulation member. Here, when a time for determining whether or not the momentary-type manipulation member is located at that position is uniquely set, a shift position different from that requested by the driver may be determined, depending on an environment (such as an ambient temperature of the shift device, a vehicle speed, a position requested by the driver, a state of power transmission by a powertrain, and the like) when shift manipulation is made through the momentary-type manipulation member. If determination is made in such a manner, the powertrain mechanism is controlled in accordance with that determination, resulting in a state not intended by the driver.

SUMMARY OF THE INVENTION

An object of the present invention is to provide a shift device of a transmission capable of appropriately responding to a driver's request in a shift device with a momentary function.

According to a first aspect of the present invention, a shift device of a transmission includes a path for reaching a plurality of shift positions, and a momentary-type movable portion manipulated so as to move along the path by a driver. The movable portion is held in a predetermined home position when it is not manipulated by the driver. The shift device further includes a recognition circuit to recognize a shift position requested by the driver from holding of the movable portion at the shift position for a predetermined recognition time, and an output circuit to output a control signal to the transmission so as to attain a power transmission state corresponding to the recognized shift position. The path includes the home position, a first shift position representing one of the plurality of shift positions, and a second shift position representing one of the plurality of shift positions and provided between the home position and the first shift position. When it is recognized that the movable portion is located at the first shift position, the power transmission state by the transmission is set to a first state. When it is recognized that the movable portion is located at the second shift position, the power transmission state by the transmission is set to a second state different from the first state. The shift device further includes a setting circuit to set the recognition time in accordance with a moving direction of the movable portion along the path.

According to the present invention, the path of the shift device includes the home position, the first shift position (forward drive position, for example), and the second shift position provided between the home position and the first shift position (neutral position, for example). The movable portion is of a momentary-type. Here, there are two possibilities that the movable portion is located at the second shift position. That is, a first case is such that the driver makes manipulation based on a request to bring a power transmission state by the transmission to the second state and the movable portion is located at the second shift position, and a second case is such that, after the driver makes manipulation based on a request to bring a power transmission state by the transmission to the first state, the movable portion comes to the second shift position on its way to return to the home position because of absence of manipulation by the driver. In the second case, the movable portion merely passes the second shift position, and the driver does not request the second state based on the second shift position. As described above, even when the movable portion is located at the same second shift position, sometimes the driver requests the second state and sometimes not. Here, a recognition time is set in accordance with a moving direction of the movable portion along the path, by means of the setting circuit. Accordingly, a time for recognizing the second shift position in the first case and a time for recognizing the second shift position in the second case can separately be set. Therefore, the driver's request can appropriately be recognized based on a duration for which the movable portion is held at the second shift position. As a result, a shift device of a transmission capable of appropriately responding to the driver's request in the shift device with a momentary function can be provided.

Preferably, the setting circuit may include a circuit to set a recognition time for recognizing the second shift position differently in a case of a first moving direction in which the movable portion moves from the home position toward the first shift position and in a case of a second moving direction in which the movable portion moves from the first shift position toward the home position.

According to the present invention, unlike the second case (the case of the second moving direction in which the movable portion moves from the first shift position toward the home position), the second shift position should be recognized in the first case (the case of the first moving direction in which the movable portion moves from the home position toward the first shift position). Therefore, if the recognition time for recognizing the second shift position is set to be short, the second shift position is quickly recognized. Thus the driver's request can appropriately be responded and the shift position can accurately be recognized. In contrast, unlike the first case, the second shift position is simply passed by the movable portion returning to the home position in the second case. Namely, recognition of the second shift position is not desired. Therefore, if the recognition time for recognizing the second shift position is extended, the second shift position is not recognized (recognized merely as a point to pass). That is, appropriate response to the driver's request is provided and the shift position can accurately be recognized.

More preferably, the setting circuit may include a circuit to set a recognition time for recognizing the second shift position to be shorter in a case of the first moving direction than in a case of the second moving direction.

According to the present invention, unlike the second case (the case of the second moving direction), recognition of the second shift position is desired in the first case (the case of the first moving direction). Therefore, if the recognition time for recognizing the second shift position is set to be short, the second shift position can quickly be recognized. In contrast, unlike the first case, the second shift position is simply passed by the movable portion returning to the home position in the second case. Namely, recognition of the second shift position is not desired. Therefore, if the recognition time for recognizing the second shift position is extended, recognition of the second shift position can be avoided. In this manner, in the first case, the driver can attain the second state by the transmission solely by holding the movable portion at the second shift position for a short period of time. In addition, even when a temperature of the hydraulic fluid in the shift device is low and the movable portion returns slowly from the first shift position toward the home position, the second shift position can be recognized solely as a point to pass.

The shift device according to another aspect of the present invention has a configuration the same as that according to the first aspect, except for the following. The shift device includes a recognition circuit to recognize a shift position requested by the driver from holding of the movable portion at the shift position for a predetermined recognition time, an output circuit to output a control signal to the transmission so as to attain a power transmission state corresponding to the recognized shift position, and a prohibition circuit to prohibit recognition of the second shift position when the movable portion is moved from the first shift position toward the home position.

According to the present invention, when the movable portion moves from the first shift position toward the home position, the second shift position is simply passed by the movable portion returning to the home position. Namely, recognition of the second shift position is not desired. Accordingly, the prohibition circuit prohibits recognition of the second shift position. In this manner, even when the temperature of the hydraulic fluid in the shift device is low and the movable portion returns slowly from the first shift position toward the home position, the second shift position is not recognized and can be recognized solely as a point to pass.

The shift device according to yet another aspect of the present invention has a configuration the same as that according to the first aspect, except for the following. The shift device includes a recognition circuit to recognize a shift position requested by the driver from holding of the movable portion at the shift position for a predetermined recognition time, an output circuit to output a control signal to the transmission so as to attain a power transmission state corresponding to the recognized shift position, a detection circuit to detect a temperature state of the shift device, and a modification circuit to modify a recognition time for recognizing the second shift position in accordance with the temperature state.

According to the present invention, when the movable portion moves from the first shift position toward the home position, the second shift position is simply passed by the movable portion returning to the home position. Here, a speed of the movable portion returning from the first shift position via the second shift position to the home position is varied, depending on the temperature of the hydraulic fluid in the shift device. The modification circuit modifies the recognition time for recognizing the second shift position in accordance with the temperature state. If the temperature is low, modification so as to extend the recognition time is made. In this manner, even when the temperature of the hydraulic fluid is low and the movable portion returns slowly from the first shift position via the second shift position toward the home position, the second shift position can be recognized solely as a point to pass.

More preferably, the modification circuit includes a circuit to make modification so as to extend a recognition time for recognizing the second shift position when a temperature is low.

According to the present invention, even when the temperature of the hydraulic fluid is low and the movable portion returns slowly from the first shift position via the second shift position to the home position, the second shift position can be recognized solely as a point to pass because the recognition time is modified to be longer when the temperature is low.

The shift device according to yet another aspect of the present invention has a configuration the same as that according to the first aspect, except for the following. The shift device includes a recognition circuit to recognize a shift position requested by the driver from holding of the movable portion at the shift position for a predetermined recognition time, and an output circuit to output a control signal to the transmission so as to attain a power transmission state corresponding to the recognized shift position. The path includes the home position, a first shift position representing one of the plurality of shift positions, a second shift position representing one of the plurality of shift positions and provided between the home position and the first shift position, and a third shift position representing one of the plurality of shift positions. When it is recognized that the movable portion is located at the first shift position, the power transmission state by the transmission is set to a first state. When it is recognized that the movable portion is located at the second shift position, the power transmission state by the transmission is set to a second state different from the first state. When it is recognized that the movable portion is located at the third shift position, the power transmission state by the transmission is set to a third state equivalent to the first state and different from the second state. The shift device further includes a setting circuit to set a recognition time for recognizing the second shift position differently in a case where the third state is set and in a case where the third state is not set.

According to the present invention, the path of the shift device includes the home position, a first shift position (forward drive position, for example), a second shift position provided between the home position and the first shift position (neutral position, for example), and a third shift position (forward drive and engine brake actuation position, for example). The movable portion is of a momentary-type. Here, with regard to the third shift position, there are two vehicle states in which the movable portion is located at the second shift position. That is, one case is such that the vehicle is in a third state (forward drive state while engine brake is actuated) that a power transmission state by the transmission corresponding to the third shift position is attained, and another case is such that the vehicle is not in such a third state. In the third state, when the driver moves the movable portion via the second shift position and holds it in the first shift position (corresponding to the forward drive), the second shift position is merely passed. Here, the recognition time for recognizing the second shift position can be set differently in the third state and in another state in which it is not the case. In other words, the time for recognizing the second shift position is set separately in the third state of the vehicle and in another state. Therefore, the driver's request can appropriately be recognized based on a duration for which the movable portion is held at the second shift position. As a result, a shift device of a transmission capable of appropriately responding to the driver's request in the shift device with a momentary function can be provided.

More preferably, the setting circuit may include a circuit to set a recognition time for recognizing the second shift position to be longer in a case where the third state is set than in a case where the third state is not set.

According to the present invention, the time for recognizing the second shift position is set differently in a case in which the vehicle is in the forward drive and engine brake actuation state by the transmission corresponding to the third shift position and in another case where the vehicle is not in such a state. In the forward drive and engine brake actuation state, the driver does not request recognition of the second shift position, and the recognition time for recognizing the second shift position is set to be longer. Therefore, the second shift position can be recognized merely as a point to pass.

The shift device according to yet another aspect of the present invention has a configuration the same as that according to the first aspect, except for the following. The shift device includes a recognition circuit to recognize a shift position requested by the driver from holding of the movable portion at the shift position for a predetermined recognition time, an output circuit to output a control signal to the transmission so as to attain a power transmission state corresponding to the recognized shift position, a detection circuit to detect a speed of a vehicle equipped with the shift device, and a modification circuit to modify a recognition time for recognizing the second shift position in accordance with the vehicle speed.

According to the present invention, normally in a high vehicle speed state, modification of the power transmission state by the transmission is less likely to be requested because of drive stability of the vehicle, while it tends to be requested in a low vehicle speed state. Therefore, the predetermined recognition time is modified in accordance with the vehicle speed, so as to adapt to the driver's request. As a result, a shift device of a transmission capable of appropriately responding to the driver's request in the shift device with a momentary function can be provided.

More preferably, the modification circuit may include a circuit to make modification so as to shorten a recognition time for recognizing the second shift position when the vehicle speed is low.

According to the present invention, in the low vehicle speed state where modification of the power transmission state by the transmission tends to be requested, in particular, the second shift position can quickly be recognized and response to the driver's request can appropriately be provided. In addition, the recognition time for recognizing the shift position requested by the driver is set shorter in the low vehicle speed state than in the high vehicle speed state. Therefore, response to the driver's request can appropriately be provided in the low vehicle speed state where modification of the power transmission state by the transmission tends to be requested.

More preferably, the first state may be limited to a forward drive state, and the second state may be limited to a neutral state. Further preferably, the first state may be limited to a forward drive state, the second state may be limited to a neutral state, and the third state may be limited to a forward driving and engine brake actuation state.

According to the present invention, the forward drive state, the neutral state, and the forward drive and engine brake actuation state can accurately be recognized in response to the request from the driver.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2 to 5 illustrate shift lever manipulation directions in a shift switch in FIG.

FIG. 13 illustrates a map showing a relation between a state before a neutral position is passed and a neutral position recognition time in the shift manipulation system in a fourth embodiment of the present invention.

FIG. 15 illustrates a map showing a relation between a state of a vehicle equipped with the shift manipulation system in a fifth embodiment of the present invention and a neutral position recognition time.

DESCRIPTION OF THE PREFERRED EMBODIMENTS

Figure 1:
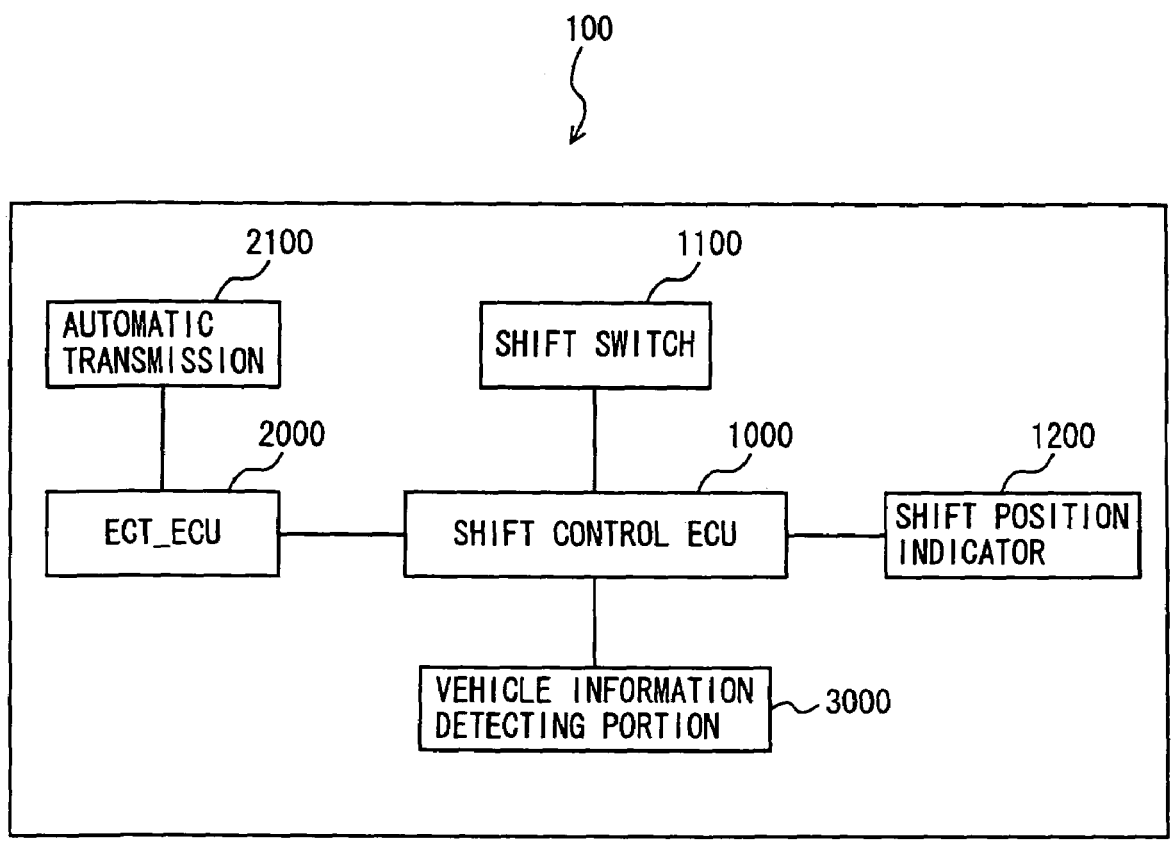
FIG. 1 is a control block diagram of a shift manipulation system according to a first embodiment of the present invention.

In the following, embodiments of the present invention will be described with reference to the figures. It is noted that the same reference characters refer to the same or corresponding components in the following description, and denotations and functions thereof are also the same. Therefore, detailed description thereof will not be repeated.

It is noted that a powertrain in a vehicle equipped with a shift manipulation system according to the embodiments of the present invention shown below is not particularly limited. For example, the automatic transmission may be an automatic transmission having a gear-type transmission mechanism or an automatic transmission having a belt-type continuously variable transmission.

In addition, a hybrid-type powertrain may be employed, in which an engine and an electric motor (motor generator) are mounted as driving sources of a vehicle and engine power is split into vehicle drive force and generator drive force by means of a power split device using a planetary gear mechanism. The generated power is directly utilized for driving the motor, or converted to direct current by an inverter so as to charge a high-voltage battery. In the planetary gear mechanism used as a power split device as above, engine torque is input to a planetary carrier, and its revolution power is in turn transmitted to the generator by a sun gear as well as to the motor and the output shaft by a ring gear. In the powertrain structured as described above, by controlling the motor generator connected to the planetary gear mechanism, a continuously variable transmission controlling rpm of the engine in a continuously variable manner can be achieved. In such a hybrid vehicle (HV) or an electric vehicle (EV), at a brake position, regenerative braking is attained in the forward drive state and regeneration is achieved by the motor generator.

First Embodiment

In the following, a shift manipulation system according to the first embodiment of the present invention will be described. FIG. 1 shows a control block diagram of the shift manipulation system according to the first embodiment of the present invention. As shown in FIG. 1, a shift manipulation system 100 includes a shift control ECU (Electronic Control Unit) 1000, a shift switch 1100, a shift position indicator 1200, an ECT_ECU (Electronic Controlled Automatic Transmission) 2000, an automatic transmission 2100, and a vehicle information detecting portion 3000.

Shift control ECU 1000 is connected to shift switch 1100, shift position indicator 1200, ECT_ECU 2000, and vehicle information detecting portion 3000. Shift control ECU 1000 transmits a shift control signal to ECT_ECU 2000 and outputs shift position indication information to shift position indicator 1200, based on a driver's request through manipulation of shift switch 1100. Vehicle information detecting portion 3000 detects a brake signal of the vehicle and information such as vehicle speed and transmits them to shift control ECU 1000.

ECT_ECU 2000 controls automatic transmission 2100 based on the shift control signal input from shift control ECU 1000.

Referring to FIGS. 2 to 5, shift switch 1100 shown in FIG. 1 will be described. Shift switch 1100 in shift manipulation system 100 according to the present embodiment has a momentary-type shift lever.

Figure 2:
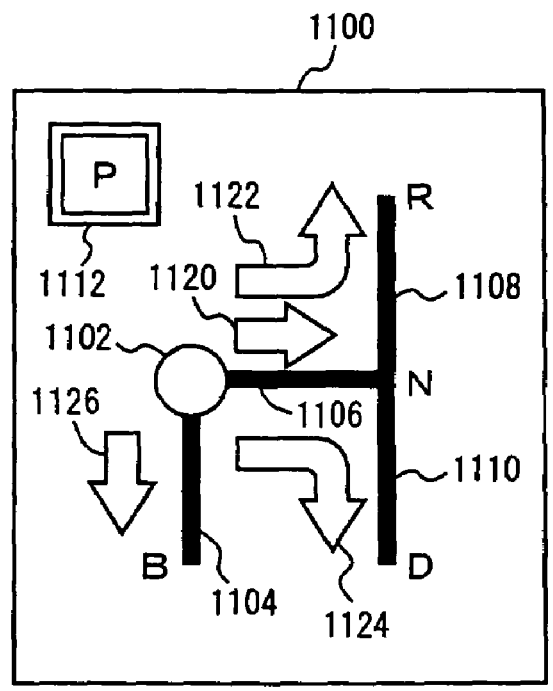

As shown in FIG. 2, shift switch 1100 is constituted of a shift lever 1102, a first groove 1104 along which shift lever 1102 is slid, a second groove 1106 along which shift lever 1102 is slid, a third groove 1108 along which shift lever 1102 is slid, and a fourth groove 1110 along which shift lever 1102 is slid.

When shift lever 1102 is moved along first groove 1104 to reach a terminal end (lower end) and held there by the driver for a time period longer than a predetermined time period, a brake position is set. Here, shift lever 1102 is moved as shown with an arrow 1126.

When shift lever 1102 is moved along second groove 1106 to reach a terminal end (right end) and held there by the driver for a time period longer than a predetermined time period, a neutral position is set. Here, shift lever 1102 is moved as shown with an arrow 1120.

When shift lever 1102 is moved along second groove 1106 to reach the terminal end (right end), further moved along third groove 1108 to reach a terminal end (upper end), and held there by the driver for a time period longer than a predetermined time period, a rearward drive position is set. Here, shift lever 1102 is moved as shown with an arrow 1122.

When shift lever 1102 is moved along second groove 1106 to reach the terminal end (right end), further moved along fourth groove 1110 to reach a terminal end (lower end), and held there by the driver for a time period longer than a predetermined time period, a forward drive position is set. Here, shift lever 1102 is moved as shown with an arrow 1124.

A parking position is set by pressing a parking position button 1112.

Shift lever 1102 of shift switch 1110 shown in FIG. 2 represents the home position, that is, a state where the driver takes his hand off shift lever 1102. As shown in FIG. 2, by moving shift lever 1102 located in the home position as shown with arrow 1120, the neutral position to set automatic transmission 2100 to a neutral state is set. By moving shift lever 1102 as shown with arrow 1122, the rearward drive position to set automatic transmission 2100 to a rearward drive state is set. By moving shift lever 1102 as shown with arrow 1124, the forward drive position is set. By moving shift lever 1102 as shown with arrow 1126, the forward drive and brake position to set automatic transmission 2100 to a forward drive and engine brake actuation state is set.

Figure 3:
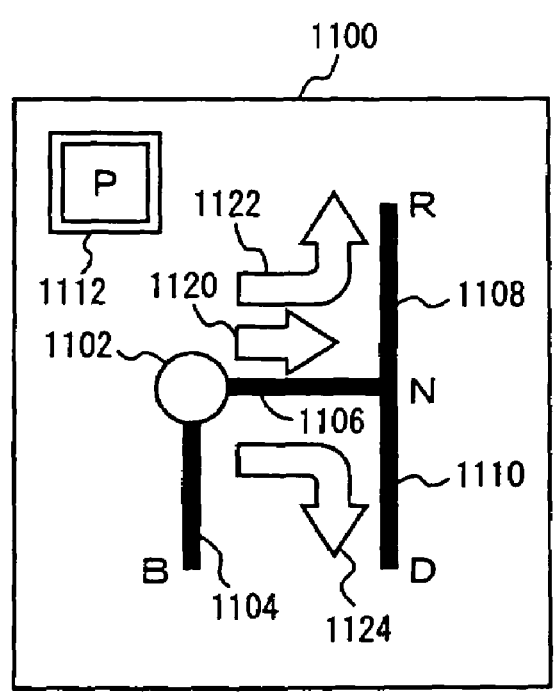

FIG. 3 shows three patterns of passing the neutral position from the home position. As shown in FIG. 3, when shift lever 1102 is moved from the home position to the forward drive position, the neutral position, and the rearward drive position, the neutral position is passed in all of these cases.

As shown in FIG. 4, when shift lever 1102 is moved from the forward drive position to the home position (when the driver finishes shift manipulation to the forward drive position and takes his hand off shift lever 1102), shift lever 1102 returns from the forward drive position via the neutral position to the home position, as shown with an arrow 1125.

As shown in FIG. 5, when shift lever 1102 returns from the rearward drive position to the home position (when the driver finishes shift manipulation to the rearward drive position and takes his hand off shift lever 1102), shift lever 1102 returns from the rearward drive position via the neutral position to the home position, as shown with an arrow 1123.

As shown in FIGS. 2 to 5, shift lever 1102 is of a momentary-type. That is, when the driver takes his hand off shift lever 1102, it is always located at the home position. If the driver desires to make a shift from the neutral position state to the forward drive position state, for example, he moves shift lever 1102 via the neutral position along second groove 1106 and fourth groove 1110 as shown with arrow 1124 in FIG. 2 and holds the lever at the lower end of fourth groove 1110 for a time period longer than a prescribed time period. Then, he takes his hand off shift lever 1102.

By holding shift lever 1102 at the forward drive position for a time period longer than a prescribed time period, a shift request for the forward drive position by the driver is recognized. Thereafter, when the driver takes his hand off shift lever 1102, shift lever 1102 returns from the forward drive position via the neutral position to the home position, as shown with arrow 1125 in FIG. 4.

Figures 6, 7:
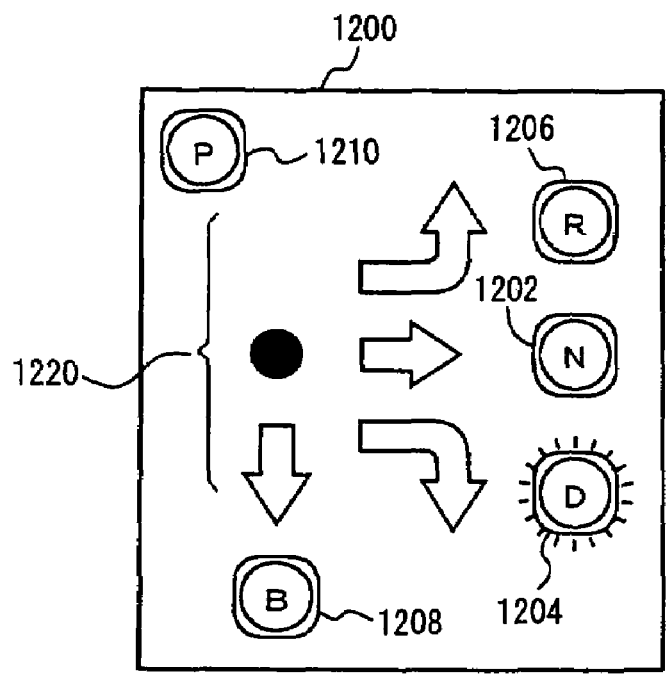
FIG. 6 illustrates a shift position indicator in FIG. 1.
FIG. 7 illustrates a map showing a relation between a state before a neutral position is passed and a neutral position recognition time in the shift manipulation system in the first embodiment of the present invention.

Referring to FIG. 6, shift position indicator 1200 shown in FIG. 1 will be described. As shown in FIG. 6, shift position indicator 1200 includes an arrow indicating portion 1220 indicating a shift manipulation direction, a neutral position lamp 1202 indicating the neutral state of automatic transmission 2100, a forward drive position lamp 1204 indicating the forward drive state of automatic transmission 2100, a rearward drive position lamp 1206 indicating the rearward drive state of automatic transmission 2100, a brake position lamp 1208 indicating the forward drive and engine brake actuation state of automatic transmission 2100, and a parking position lamp 1210 indicating the parking state.

Any one of neutral position lamp 1202, forward drive position lamp 1204, rearward drive position lamp 1206, brake position lamp 1208, and parking position lamp 1210 is turned on. The driver can know a current shift position state of the vehicle by visually checking shift position indicator 1200 shown in FIG. 6.

FIG. 7 illustrates a map showing a relation between a state before the neutral position is passed and a neutral position recognition time in the shift manipulation system. As shown in FIG. 7, the neutral position recognition time is different, depending on a shift lever position before the neutral position is passed.

The neutral position recognition time when shift lever 1102 is located at the home position before the neutral position is passed is set as TN(1), while the neutral position recognition time when shift lever 1102 before passing the neutral position is located at the forward drive position or the rearward drive position is set as TN(2), separately.

Here, neutral position recognition time TN(1) is set to be shorter than neutral position recognition time TN(2) because of the following reasons. When shift lever 1102 is moved from the home position to the neutral position by the driver, desirably, immediate recognition of the neutral position is desired. On the other hand, when shift lever 1102 automatically returns from the forward drive position or the rearward drive position via the neutral position to the home position, recognition of the neutral position is not desired. Therefore, the neutral position recognition time is set to be longer, when the shift lever returns from the forward drive position or the rearward drive position to the home position.

Figure 8:
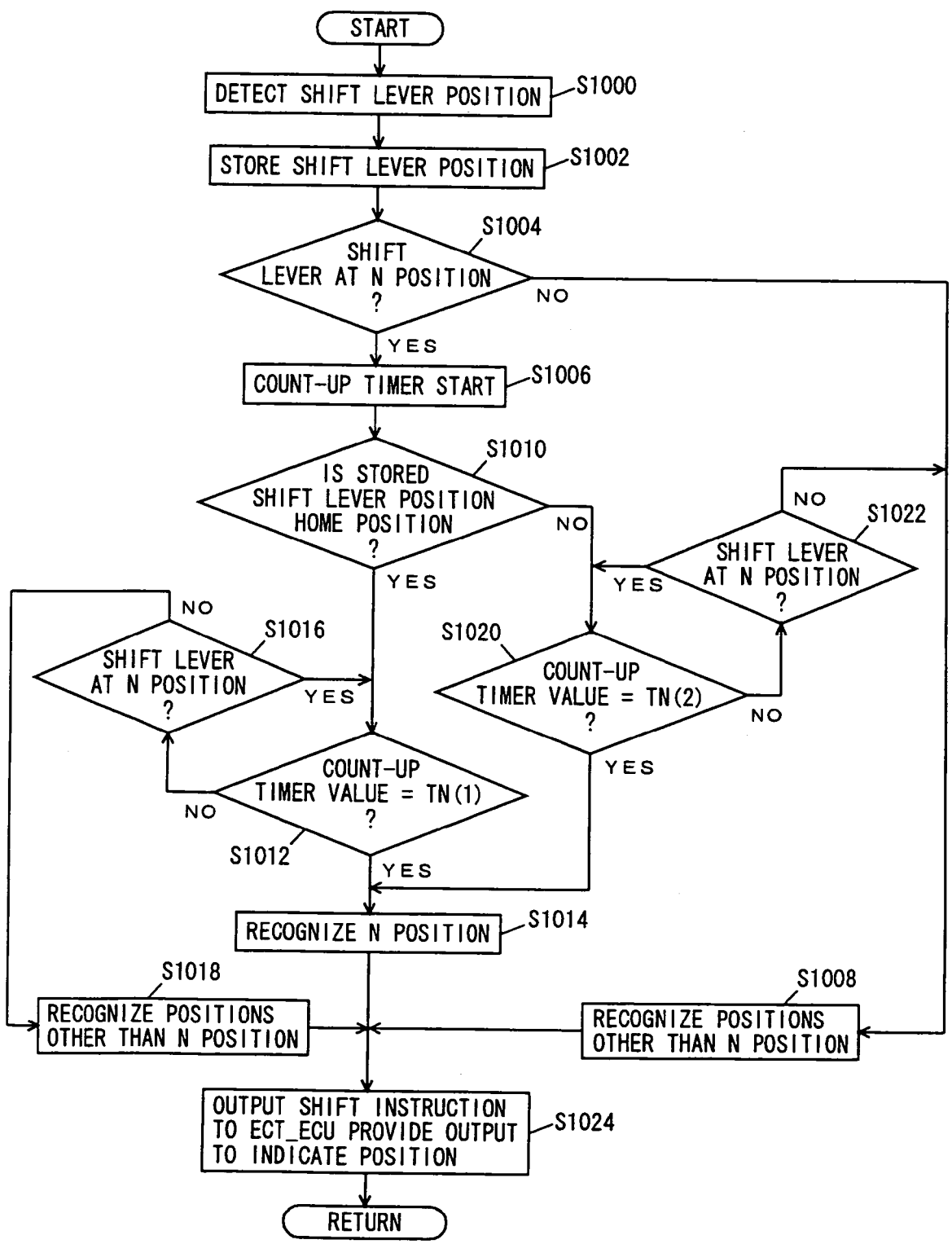
FIG. 8 is a flowchart illustrating a control configuration of a program executed in the shift manipulation system in the first embodiment of the present invention.

Referring to FIG. 8, a control configuration of a program executed in shift control ECU 1000 in the shift manipulation system in the first embodiment will now be described.

At step 1000 (hereinafter, step is abbreviated as "S"), shift control ECU 1000 detects a position of shift lever 1102. At S1002, shift control ECU 1000 stores the position of shift lever 1102. At S1004, shift control ECU 1000 determines whether or not shift lever 1102 is located at the neutral position. If shift lever 1102 is located at the neutral position (YES at step S1004), the process proceeds to S1006. If shift lever 1102 is not located at the neutral position (NO at step S1004), the process proceeds to S1008.

At S1006, shift control ECU 1000 starts a count-up timer. At S1008, shift control ECU 1000 recognizes positions other than the neutral position. Thereafter, the process proceeds to S1024.

At S1010, shift control ECU 1000 determines whether or not the stored position of shift lever 1102 is the home position. If the stored position of shift lever 1102 is the home position (YES at S1010), the process proceeds to S1012. Otherwise (NO at S1010), the process proceeds to S1020.

At S1012, shift control ECU 1000 determines whether or not a count-up timer value attains TN(1). If the count-up timer value attains TN(1) (YES at S1012), the process proceeds to S1014. Otherwise (NO at S1012), the process proceeds to S1016.

At S1016, shift control ECU 1000 determines whether or not shift lever 1102 is located at the neutral position. If shift lever 1102 is located at the neutral position (YES at step S1016), the process proceeds to S1012. If shift lever 1102 is not located at the neutral position (NO at step S1016), the process proceeds to S1018.

At S1018, shift control ECU 1000 recognizes positions other than the neutral position. Thereafter, the process proceeds to S1024.

At S1020, shift control ECU 1000 determines whether or not a count-up timer value attains TN(2). If the count-up timer value attains TN(2) (YES at S1020), the process proceeds to S1014. If the count-up timer value does not attain TN(2)(NO at S1020), the process proceeds to S1022.

At S1022, shift control ECU 1000 determines whether or not shift lever 1102 is located at the neutral position. If shift lever 1102 is located at the neutral position (YES at step S1022), the process proceeds to S1020. Otherwise (NO at step S1022), the process proceeds to S1008.

At S1024, shift control ECU 1000 outputs a shift instruction to ECT_ECU 2000, and provides an output to cause shift position indicator 1200 to show a position.

An operation of the shift manipulation system according to the present embodiment based on the above-described configuration and the flowchart will now be discussed.

[From Home Position to Neutral Position]

In the following, an operation of the shift manipulation system when the driver requests shift to the neutral position while shift lever 1102 is at the home position will be described. Here, the driver moves shift lever 1102 along second groove 1106 to the neutral position as shown with arrow 1120 in FIGS. 2 and 3 and holds shift lever 1102 at the neutral position.

When the position of shift lever 1102 is detected (S1000), the position of the shift lever is stored (S1002). Here, the position of shift lever 1102 is stored as the home position. When the shift lever is moved to the neutral position as shown with arrow 1120 in FIGS. 2 and 3 (YES at S1004), the count-up timer is started (S1006). The position of shift lever 1102 has been stored as the home position (YES at S1010). Therefore, when the count-up timer value attains TN(1) (YES at S1012), the neutral position is recognized (S1014).

Thereafter, the shift instruction to the neutral position is output to ECT_ECU 2000, and an output to turn on neutral position lamp 1202 of shift position indicator 1200 is provided (S1024).

Here, as shown in FIG. 7, the neutral position recognition time has been set respectively, corresponding to the case in which shift lever 1102 is located at the home position before the neutral position is passed, and to the case in which its position is the forward drive position or the rearward drive position, and in addition, neutral position recognition time TN(1) is set to be shorter. Therefore, if the driver holds shift lever 1102 at the neutral position only for a short period of time, the neutral position can be recognized.

[Shift from Forward Drive Position or Rearward Drive Position to Home Position]

In the following, an operation of the shift lever manipulation system when shift lever 1102 is moved from the forward drive position to the home position or from the rearward drive position to the home position as shown with arrow 1125 in FIG. 4 or arrow 1123 in FIG. 5 will be described.

The position of shift lever 1102 is detected (S1000), and the position of the shift lever is stored (S1002). Here, the forward drive position or the rearward drive position is stored. In other words, the driver moves shift lever 1102 from the home position to the forward drive position or the rearward drive position and holds shift lever 1102 for a time period longer than a prescribed time period. Thereafter, he takes his hand off shift lever 1102. Here, the shift lever position is stored as the forward drive position or the rearward drive position. When the driver takes his hand off shift lever 1102, the shift lever returns to the home position.

When the shift lever comes to the neutral position in returning to the home position (YES at S1104), the count-up timer starts (S1106). As the stored shift lever position is not the home position (NO at S1010), the neutral position is not recognized unless the count-up timer attains TN(2).

In other words, as shown in FIG. 7, neutral position recognition time TN(2) is set to be long. As the shift lever moves from the neutral position to the home position before the count-up timer value attains TN(2) (NO at S1020, NO at S1022), the forward drive position or the rearward drive position other than the neutral position continues to be recognized and the neutral position will not be recognized.

The shift manipulation system operates in the above-described manner when the shift lever moves to the home position via the neutral position after the shift lever is set to the forward drive position or the rearward drive position shown in FIGS. 4 and 5.

As described above, according to the shift manipulation system in the present embodiment, the path of the shift switch includes a path from the home position to the forward drive position; a path from the home position to the forward drive position and the rearward drive position; and a path from the home position to the neutral position provided between the forward drive position and the rearward drive position. As the shift lever is of a momentary-type, there are two possibilities that the shift lever is located at the neutral position. That is, a case in which the neutral position is requested, and a case in which the shift lever passes the neutral position when it automatically returns to the home position after the forward drive position or the rearward drive position is requested. In such a case, the position of the shift lever before passing the neutral position is stored in advance. Then, if the position of the shift lever before passing the neutral position is the home position, the shorter neutral position recognition time is set. On the other hand, if the position of the shift lever before passing the neutral position is the forward drive position or the rearward drive position, the longer neutral position recognition time is set. In this manner, the neutral position is less likely to be recognized when the shift lever returns from the forward drive position or the rearward drive position to the home position. On the other hand, if the driver desires to move the shift lever from the home position to the neutral position, the neutral position can be recognized in a short period of time. As a result, in a momentary-type shift device, response to the driver's request can appropriately be provided.

Second Embodiment

In the following, a shift manipulation system according to a second embodiment of the present invention will be described. The shift manipulation system according to the present embodiment is characterized by a shift switch 1101 shown in FIG. 9 instead of shift switch 1100 in the shift manipulation system in the first embodiment described previously. Other configuration in the second embodiment is similar to that in the first embodiment, and detailed description thereof will not be repeated.

Figure 9:
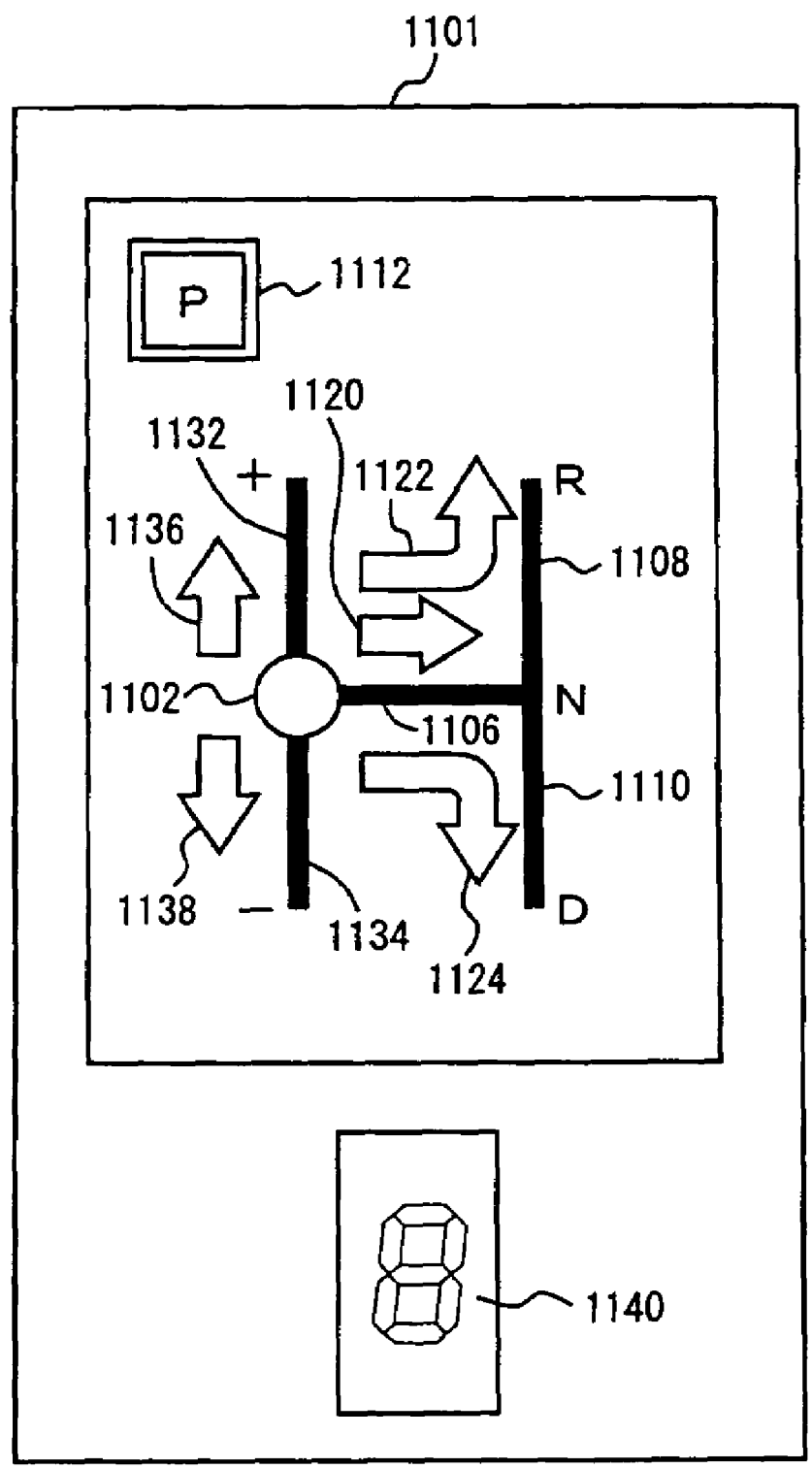
FIG. 9 illustrates shift lever manipulation directions in a shift switch according to a second embodiment of the present invention.

As shown in FIG. 9, unlike shift switch 1100 in the first embodiment described previously, shift switch 1101 in the shift manipulation system according to the present embodiment attains a function as follows. Shift lever 1102 is moved along a shift-up groove 1132 as shown with an arrow 1136, so as to shift up automatic transmission 2100. In addition, shift lever 1102 is moved along a shift-down groove 1134 as shown with an arrow 1138, so as to shift down automatic transmission 2100. An engine brake function is attained by shift-down.

Shift switch 1101 further includes an indicator 1140 indicating shift positions of automatic transmission 2100, for example, by indicating a first range as "1" and a second range as "2".

In the shift manipulation system according to the present embodiment, in a manner similar to the first embodiment described above, the neutral position recognition time when the shift lever is moved from the home position to the neutral position and the neutral position recognition time when the shift lever is moved from the forward drive position or the rearward drive position to the neutral position are set differently. As a result, in a momentary-type shift device, response to the driver's request can appropriately be provided.

Third Embodiment

In the following, a shift manipulation system according to a third embodiment of the present invention will be described. The shift manipulation system according to the present embodiment is different from those in the first and second embodiments in that the neutral position recognition time is modified depending on a temperature of the shift switch.

Figure 10:
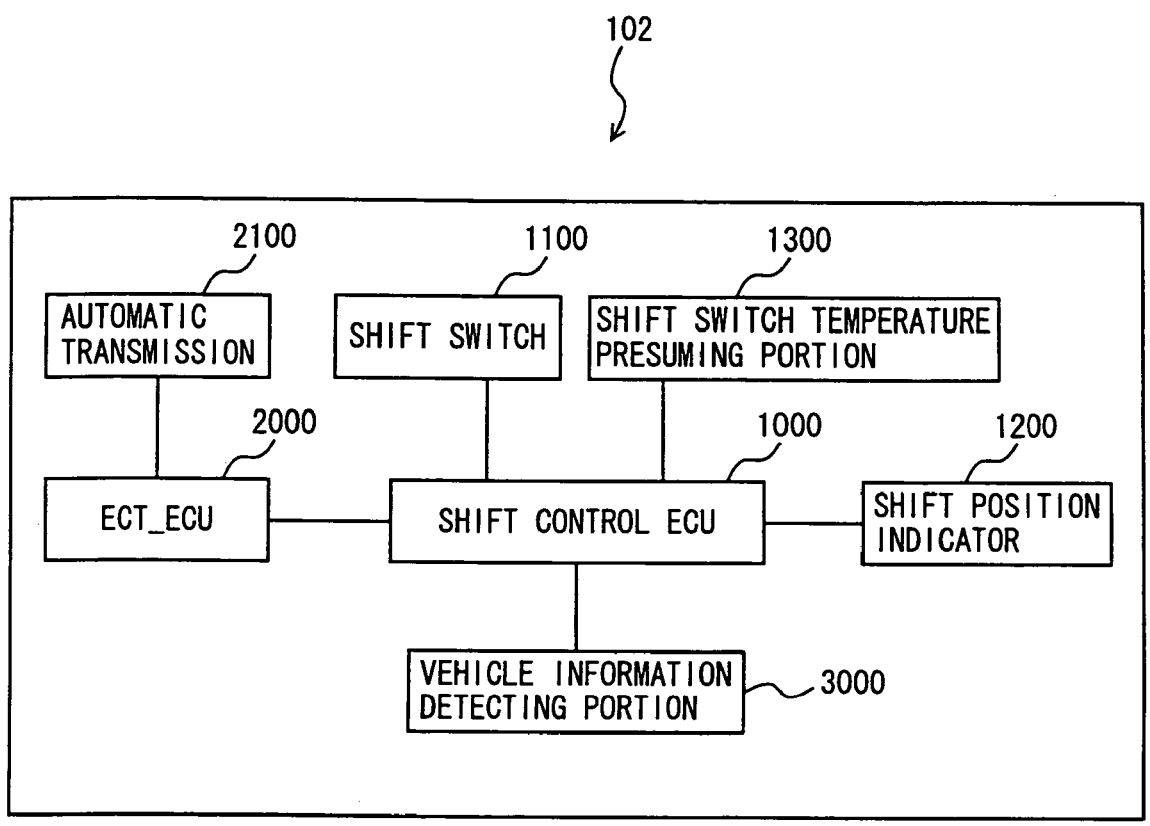
FIG. 10 is a control block diagram of a shift manipulation system according to a third embodiment of the present invention.

FIG. 10 is a control block diagram of a shift manipulation system 102 according to the present embodiment. In the control block diagram shown in FIG. 10, the same reference characters refer to the same or corresponding components in the control block diagram shown in FIG. 1, and functions thereof are also the same. Therefore, detailed description thereof will not be repeated.

As shown in FIG. 10, shift manipulation system 102 according to the present embodiment further includes a shift switch temperature presuming portion 1300 in addition to the configuration of shift manipulation system 100 in the first embodiment described previously. Shift switch temperature presuming portion 1300 can be implemented, for example, by a room temperature sensor for an air conditioner in a vehicle.

As shown in FIGS. 2 to 5, shift switch 1100 has a plurality of grooves, which are filled with hydraulic fluid in order for shift lever 1102 to slide. The hydraulic fluid has low viscosity when a temperature is high and has high viscosity when the temperature is low, as the ordinary hydraulic fluids. When the temperature is low, movement of shift lever 1102 becomes slow.

Figures 11, 12:
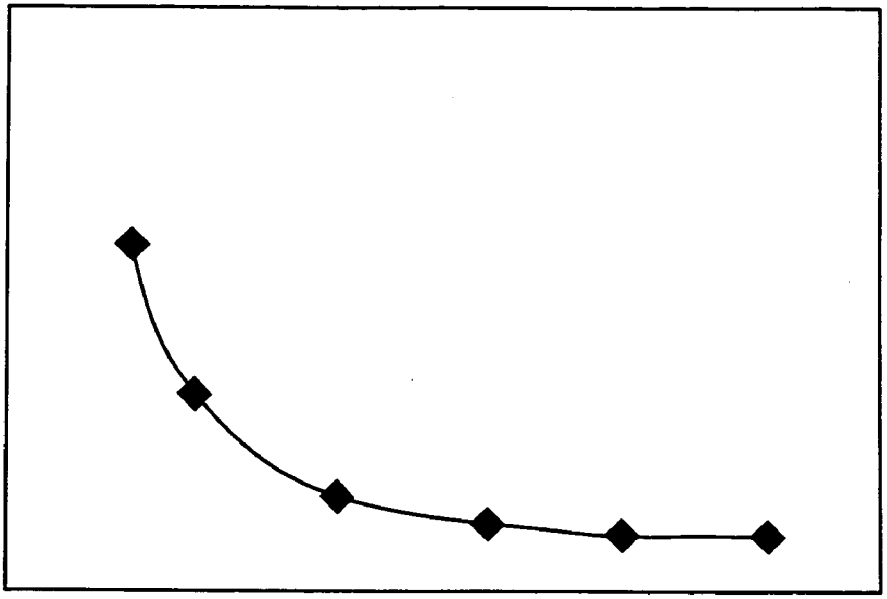
FIG. 11 illustrates a relation between an atmospheric temperature of a shift switch and a time required for passing a neutral position in the shift manipulation system in the third embodiment of the present invention.
FIG. 12 illustrates a map showing a relation between a temperature and a neutral position recognition time in the shift manipulation system in the third embodiment of the present invention.

Such a state is shown in FIG. 11. As shown in FIG. 11, the abscissa represents an atmospheric temperature of shift switch 1100, and the ordinate represents a time required to pass the neutral position when the shift lever is moved from the forward drive position or the rearward drive position to the home position. The lower the atmospheric temperature of shift switch 1100 is, the lower the temperature of the hydraulic fluid filling shift switch 1100 is, that is, the higher the viscosity is. Therefore, the time required to pass the neutral position becomes longer.

Therefore, as shown in FIG. 12, neutral position recognition time TN(2) is set longer as the atmospheric temperature of shift switch 1100 is low. On the other hand, neutral position recognition time TN(2) is set shorter as the atmospheric temperature of shift switch 1100 is high.

In this manner, neutral position recognition time TN(2) is set based on the atmospheric temperature of shift switch 1100. When the shift lever is moved from the forward drive position or the rearward drive position to the home position, the neutral position is recognized merely as a point to pass for returning to the home position. Here, if the temperature of the hydraulic fluid in shift switch 1100 is low, the time required for passing the neutral position becomes longer. Therefore, by setting neutral position recognition time TN(2) to be longer, even if the shift lever moves slow due to low hydraulic fluid temperature and resultant high viscosity, that is, even if the shift lever returns slowly from the forward drive position or the rearward drive position via the neutral position to the home position, the neutral position is recognized merely as a point to pass, and shift to the neutral position is not recognized.

Fourth Embodiment

In the following, a shift manipulation system according to a fourth embodiment of the present invention will be described. The shift manipulation system according to the present embodiment is characterized in that the neutral position recognition time is modified depending on whether the position before the neutral position is passed is the break position or positions other than that. It is noted that the control block diagram of the shift manipulation system in the present embodiment is the same as that in the first embodiment described above (FIG. 1), and detailed description thereof will not be repeated.

Referring to FIG. 13, a map showing a relation between a position of shift lever 1102 before passing the neutral position and the neutral position recognition time will be described. When the position of shift lever 1102 before passing the neutral position is the brake position, the neutral position recognition time is set to TN(3). On the other hand, when the position thereof is any position other than the brake position, the neutral position recognition time is set to TN(4). Here, neutral position recognition time TN(3) is set to be longer than neutral position recognition time TN(4). With such a setting, when the position is changed from the brake position to the forward drive position, the neutral position will not be recognized.

Figure 14:
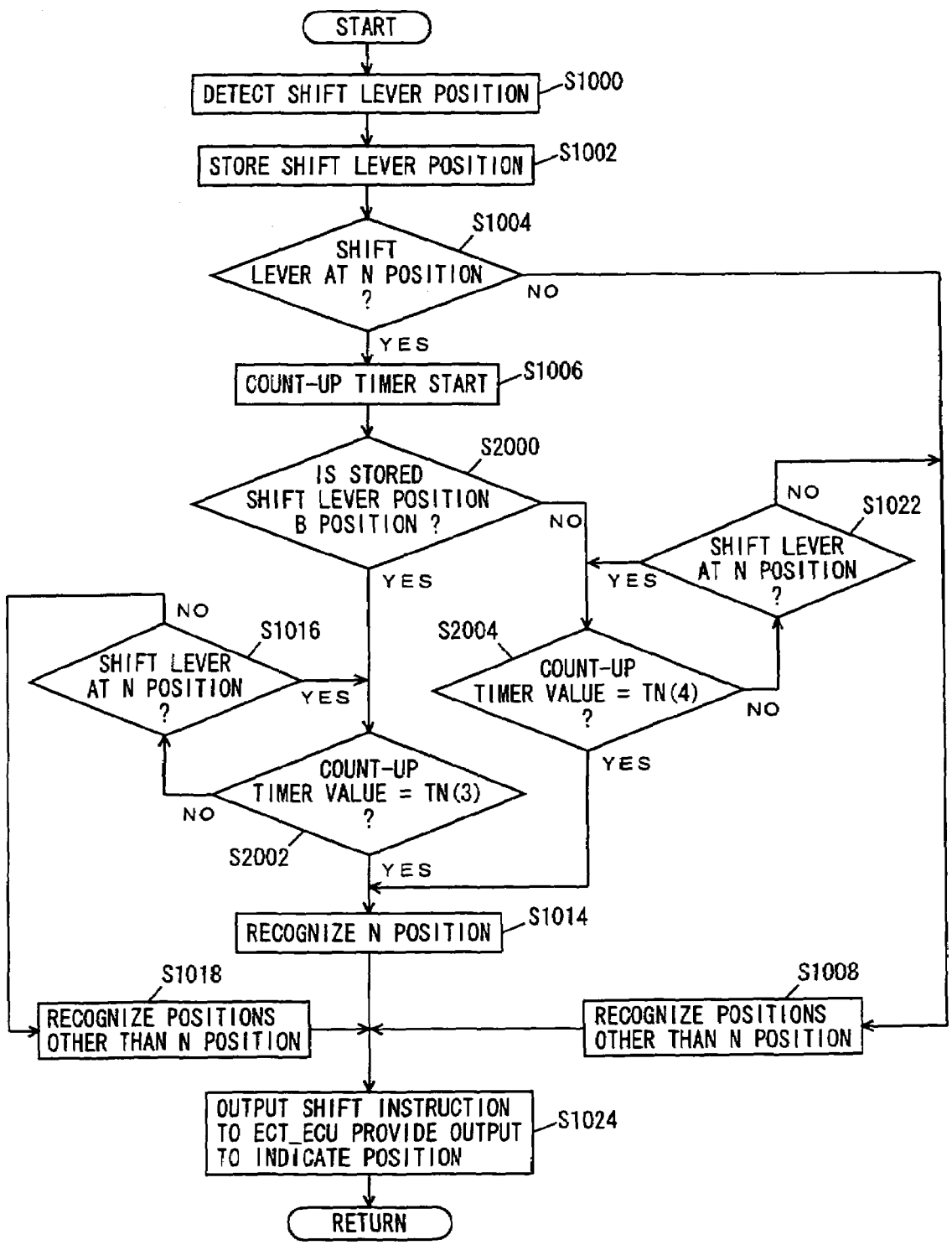
FIG. 14 is a flowchart illustrating a control configuration of a program executed in the shift manipulation system according to the fourth embodiment of the present invention.

Referring to FIG. 14, a control configuration of a program executed in shift control ECU 1000 in the shift manipulation system in the present embodiment will now be described. It is noted that the same step number is given to the same processing in the flowcharts of FIGS. 8 and 14 and what is processed in those steps is also the same. Therefore, detailed description thereof will not be repeated.

At S2000, shift control ECU 1000 determines whether or not the stored shift lever position is the brake position. If the stored shift lever position is the brake position (YES at step S2000), the process proceeds to S2002. Otherwise (NO at step S2000), the process proceeds to S2004.

At S2002, shift control ECU 1000 determines whether or not the count-up timer value attains TN(3). If the count-up timer value attains TN(3) (YES at S2002), the process proceeds to S1014. If the count-up timer value does not attain TN(3) (NO at S2002), the process proceeds to S1016.

At S2004, shift control ECU 1000 determines whether or not the count-up timer value attains TN(4). If the count-up timer value attains TN(4) (YES at S2004), the process proceeds to S1014. If the count-up timer value does not attain TN(4) (NO at S2004), the process proceeds to S2022.

An operation of the shift manipulation system according to the present embodiment based on the above-described configuration and the flowchart will now be discussed.

[When Shift Lever is Located at Brake Position Before Passing Neutral Position]

An operation when the driver of the vehicle makes a shift from the brake position state to the forward drive position state, that is, from engine brake actuation state to release of engine brake actuation, will be described.

The position of the shift lever is detected (S1000), and the position of the shift lever is stored (S1002). Here, it is stored as the brake position. When shift lever 1102 is moved from the brake position to the forward drive position, shift lever 1102 is determined to be located at the neutral position on its way (YES at S 1004), and the count-up timer starts (S1006). As the stored shift lever position is the brake position (YES at S2000), the neutral position is not recognized until the count-up timer attains TN(3). In other words, as neutral position recognition time TN(3) is set to be longer, the neutral position is less likely to be recognized.

In this manner, when the shift lever passes the neutral position when its position is changed from the brake position to the forward drive position, the neutral position will not be recognized in an undue manner.

[When Shift Lever is Located at Positions Other than Brake Position Before Passing Neutral Position]

As the stored position of shift lever 1102 is not the brake position (NO at S2000), the neutral position is recognized (S1014) when the count-up timer value attains TN(4) (YES at S2004). Here, as neutral position recognition time TN(4) is set to be shorter, the neutral position is recognized more quickly when the shift lever passes the neutral position from positions other than the brake position.

As described above, according to the shift manipulation system in the present embodiment, the time for recognizing the neutral position can be set differently in a case when the shift lever moves from the brake position via the neutral position and in a case other than the former. Therefore, the driver's request can appropriately be recognized based on the time for which the shift lever is held at the neutral position.

Fifth Embodiment

In the following, a shift manipulation system according to a fifth embodiment of the present invention will be described. The shift manipulation system according to the present embodiment is characterized in that the neutral position recognition time is set depending on the state of the vehicle. It is noted that the control block diagram of the shift manipulation system in the present embodiment is the same as that in the first embodiment described above (FIG. 1), and detailed description thereof will not be repeated.

In the control block diagram shown in FIG. 1, the vehicle speed is input to shift control ECU 1000 from vehicle information detecting portion 3000.

Referring to FIG. 15, a map showing a relation between the state of the vehicle equipped with the shift manipulation system according to the present embodiment and the neutral position recognition time will be described.

When the vehicle is in the drive state, the neutral position recognition time is set to TN(5), and when the vehicle is at rest, the neutral position recognition time is set to TN(6). Here, neutral position recognition time TN(5) is set to be longer than neutral position recognition time TN(6).

Figure 16:
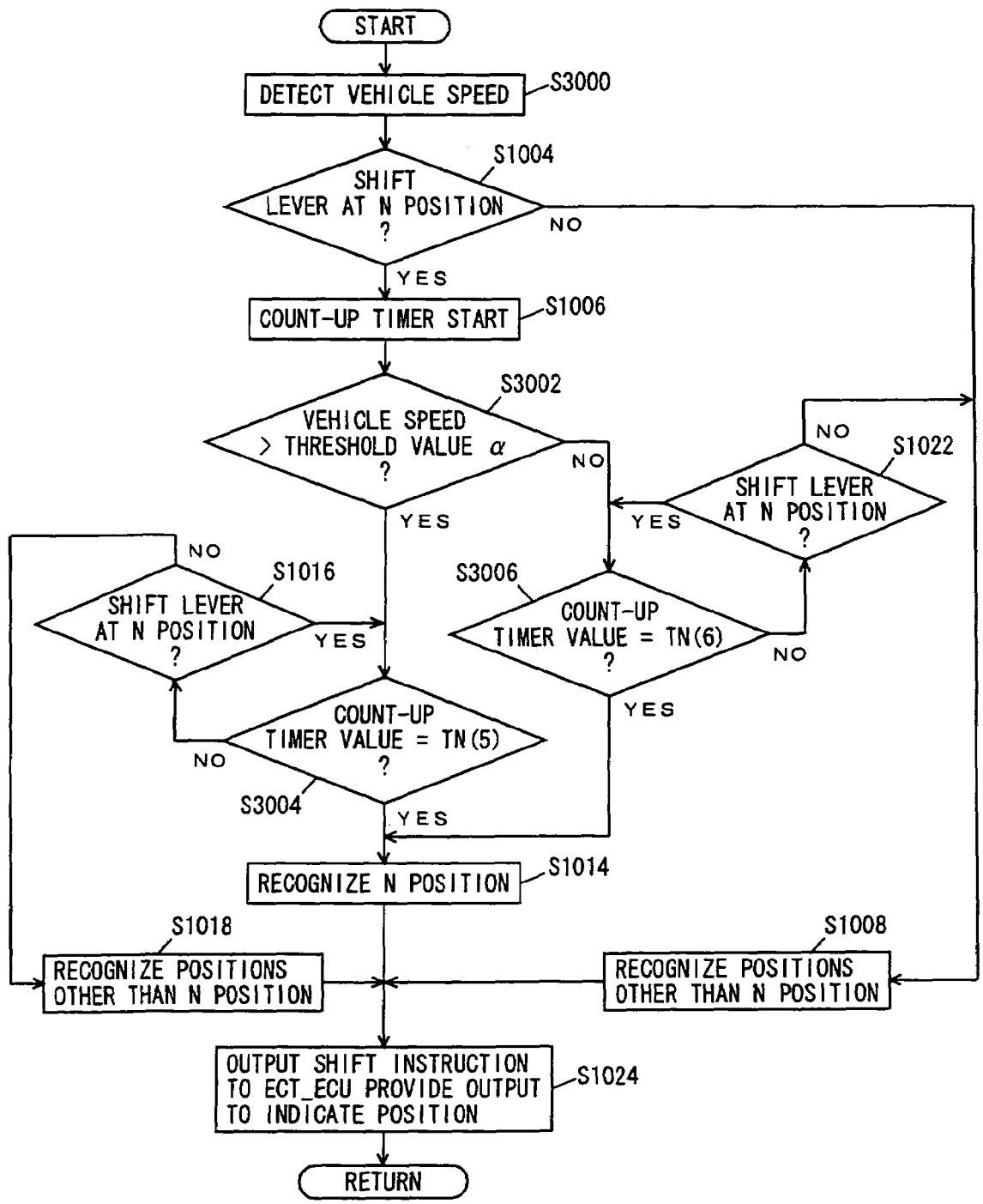
FIG. 16 is a flowchart illustrating a control configuration of a program executed in the shift manipulation system in the fifth embodiment of the present invention.

Referring to FIG. 16, a control configuration of a program executed in shift control ECU 1000 in the shift manipulation system according to the present embodiment will now be described. It is noted that the same step number is given to the same processing in the flowcharts of FIGS. 1 and 16 and what is processed in those steps is also the same. Therefore, detailed description thereof will not be repeated.

At S3000, shift control ECU 1000 detects the vehicle speed. This processing is performed based on the vehicle speed signal input from vehicle information detecting portion 3000 to shift control ECU 1000.

At S3002, the shift control ECU determines whether or not the detected vehicle speed is larger than a threshold value $\alpha$ ($\alpha>0$). If the detected vehicle speed is larger than threshold value $\alpha$ (YES at S3002), the process proceeds to S3004. Otherwise (NO at S3002), the process proceeds to S3006.

At S3004, shift control ECU 1000 determines whether or not the count-up timer value attains TN(5). If the count-up timer value attains TN(5) (YES at S3004), the process proceeds to S1014. If the count-up timer value does not attain TN(5) (NO at S3004), the process proceeds to S1016.

At S3006, shift control ECU 1000 determines whether or not the count-up timer value attains TN(6). If the count-up timer value attains TN(6) (YES at S3006), the process proceeds to S1014. If the count-up timer value does not attain TN(6)(NO at S3006), the process proceeds to S1022.

An operation of the shift manipulation system according to the present embodiment based on the above-described configuration and the flowchart will now be discussed.

[When Vehicle is in Drive State]

In the following, an operation of the shift manipulation system when the vehicle is in the drive state will be described.

When the vehicle speed is detected (S3000) and shift lever 1002 comes to the neutral position (YES at S1004), the count-up timer is started (S1006). As the vehicle speed is larger than threshold value α (YES at S3002), the neutral position is not recognized (S1014) until the count-up timer value attains TN(5) (YES at S3004).

Here, as the neutral position recognition time TN(5) is set to be longer, the setting is such that the neutral position is less likely to be recognized when the vehicle is in the drive state. When the vehicle is running, modification of the power transmission state by the automatic transmission does not tend to be requested because of drive stability of the vehicle. Therefore, the neutral position recognition time TN(5) is set to be longer, so that the neutral position is less likely to be recognized.

[When Vehicle is at Rest]

In the following, an operation of a shift manipulation system when the vehicle is at rest will be described.

The vehicle speed is detected (S3000) and the vehicle speed is smaller than threshold value α (NO at S3002). When the count-up timer attains TN(6) (YES at S3006), the neutral position is recognized (S1014). The neutral position recognition time when the vehicle is at rest is set to be shorter. Therefore, the count-up timer tends to expire at TN(6) (YES at S3006), and the neutral position is readily recognized (S1014).

When the vehicle is at rest or in the low vehicle speed state, modification in the power transmission state by the transmission is requested. If the neutral position recognition time is set to be short, the neutral position can be recognized by holding of shift lever 1102 by the driver at the neutral position for a short period of time.

As described above, according to the shift manipulation system in the present embodiment, the neutral position recognition time is modified based on the state of the vehicle (vehicle speed). Normally, in the high vehicle speed state, modification in the power transmission state by the automatic transmission does not tend to be requested because of drive stability of the vehicle. Accordingly, possibility of request for the neutral position is also low and the neutral position recognition time is set to be longer. On the other hand, when the vehicle speed is low or the vehicle is at rest, modification in the power transmission state by the transmission is likely to be requested. Accordingly, the neutral position recognition time is set to be shorter, so that the neutral position is readily recognized.

OTHER EMBODIMENTS

In the following, embodiments combining the above-described embodiments will be described.

For example, a sixth embodiment may be implemented by combining the fourth embodiment and the fifth embodiment. Specifically, the neutral position recognition time is modified based on whether or not the position before the neutral position is passed is the brake position as well as on the vehicle speed, so as to control recognition of the neutral position.

As a seventh embodiment, the shift manipulation system according to the third to fifth embodiments may be applied to shift switch 1101 (FIG. 9) described in connection with the second embodiment.

In addition, a shift manipulation system obtained from any combination of the shift manipulation systems according to the first to seventh embodiments may be implemented. It is noted that a combination including opposing conditions is not allowed.

Moreover, a setting may be such that the neutral position is not recognized under a predetermined condition (recognition of the neutral position is prohibited), instead of modifying the neutral position recognition time when a predetermined condition is satisfied.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A shift device of a transmission, comprising:
a path for reaching a plurality of shift positions; and
a momentary-type movable portion manipulated so as to move along said path by a driver; wherein
said movable portion is held at a predetermined home position when it is not manipulated by the driver,
said shift device further comprises
recognition means for recognizing a shift position requested by the driver from holding of said movable portion at said shift position for a predetermined recognition time, and
output means for outputting a control signal to said transmission so as to attain a power transmission state corresponding to said recognized shift position,
said path includes said home position, a first shift position representing one of the plurality of shift positions, and a second shift position representing one of the plurality of shift positions and provided between said home position and said first shift position,
when it is recognized that said movable portion is located at said first shift position, the power transmission state by said transmission is set to a first state, and when it is recognized that said movable portion is located at said second shift position, the power transmission state by said transmission is set to a second state different from said first state, and
said shift device further comprises prohibition means for prohibiting recognition of said second shift position when said movable portion is moved from said first shift position toward said home position.

2. A shift device of a transmission, comprising:
a path for reaching a plurality of shift positions; and
a momentary-type movable portion manipulated so as to move along said path by a driver; wherein
said movable portion is held at a predetermined home position when it is not manipulated by the driver,
said shift device further comprises
recognition means for recognizing a shift position requested by the driver from holding of said movable portion at said shift position for a predetermined recognition time, and
output means for outputting a control signal to said transmission so as to attain a power transmission state corresponding to said recognized shift position, said path includes said home position, a first shift position representing one of the plurality of shift positions, a second shift position representing one of the plurality of shift positions and provided between said home position and said first shift position, and a third shift position representing one of the plurality of shift positions, when it is recognized that said movable portion is located at said first shift position, the power transmission state by said transmission is set to a first state, when it is recognized that said movable portion is located at said second shift position, the power transmission state by said transmission is set to a second state different from said first state, and when it is recognized that said movable portion is located at said third shift position, the power transmission state by said transmission is set to a third state equivalent to said first state and different from said second state, and said shift device further comprises setting means for setting a recognition time for recognizing said second shift position differently in a case where said third state is set and in a case where said third state is not set.

3. The shift device of a transmission according to claim 2, wherein
said first state is a forward drive state, said second state is a neutral state, and said third state is a forward drive and engine brake actuation state.

4. The shift device of a transmission according to claim 2, wherein
said setting means includes means for setting a recognition time for recognizing said second shift position to be longer in a case where said third state is set than in a case where said third state is not set.

5. The shift device of a transmission according to claim 4, wherein
said first state is a forward drive state, said second state is a neutral state, and said third state is a forward drive and engine brake actuation state.

6. A shift device of a transmission, comprising:
a path for reaching a plurality of shift positions; and
a momentary-type movable portion manipulated so as to move along said path by a driver; wherein
said movable portion is held at a predetermined home position when it is not manipulated by the driver,
said shift device further comprises
a recognition circuit to recognize a shift position requested by the driver from holding of said movable portion at said shift position for a predetermined recognition time, and
an output circuit to output a control signal to said transmission so as to attain a power transmission state corresponding to said recognized shift position,
said path includes said home position, a first shift position representing one of the plurality of shift positions, and a second shift position representing one of the plurality of shift positions and provided between said home position and said first shift position,
when it is recognized that said movable portion is located at said first shift position, the power transmission state by said transmission is set to a first state, and when it is recognized that said movable portion is located at said second shift position, the power transmission state by said transmission is set to a second state different from said first state, and said shift device further comprises a prohibition circuit to prohibit recognition of said second shift position when said movable portion is moved from said first shift position toward said home position.

7. A shift device of a transmission, comprising:
a path for reaching a plurality of shift positions; and
a momentary-type movable portion manipulated so as to move along said path by a driver; wherein
said movable portion is held at a predetermined home position when it is not manipulated by the driver,
said shift device further comprises
a recognition circuit to recognize a shift position requested by the driver from holding of said movable portion at said shift position for a predetermined recognition time, and
an output circuit to output a control signal to said transmission so as to attain a power transmission state corresponding to said recognized shift position,
said path includes said home position, a first shift position representing one of the plurality of shift positions, a second shift position representing one of the plurality of shift positions and provided between said home position and said first shift position, and a third shift position representing one of the plurality of shift positions, when it is recognized that said movable portion is located at said first shift position, the power transmission state by said transmission is set to a first state, when it is recognized that said movable portion is located at said second shift position, the power transmission state by said transmission is set to a second state different from said first state, and when it is recognized that said movable portion is located at said third shift position, the power transmission state by said transmission is set to a third state equivalent to said first state and different from said second state, and said shift device further comprises a setting circuit to set a recognition time for recognizing said second shift position differently in a case where said third state is set and in a case where said third state is not set.

8. The shift device of a transmission according to claim 7, wherein
said first state is a forward drive state, said second state is a neutral state, and said third state is a forward drive and engine brake actuation state.

9. The shift device of a transmission according to claim 7, wherein
said setting circuit includes a circuit to set a recognition time for recognizing said second shift position to be longer in a case where said third state is set than in a case where said third state is not set.

10. The shift device of a transmission according to claim 9, wherein
said first state is a forward drive state, said second state is a neutral state, and said third state is a forward drive and engine brake actuation state.

* * * * *